United States Patent [19]

Tusim et al.

[11] Patent Number: 5,411,684
[45] Date of Patent: May 2, 1995

[54] PROCESS FOR MAKING LARGE CROSS-SECTION OLEFINIC POLYMER FOAM STRUCTURE BLOWN WITH 1,1-DIFLUOROETHANE

[75] Inventors: Martin H. Tusim, Newark; Chung P. Park, Pickerington, both of Ohio

[73] Assignee: The Dow Chemical Company, Midland, Mich.

[21] Appl. No.: 56,231

[22] Filed: Apr. 30, 1993

[51] Int. Cl.$^6$ ............................................. B29C 67/22
[52] U.S. Cl. ........................................ 264/53; 264/51; 521/79; 521/143
[58] Field of Search ............... 264/53, DIG. 5, 51; 521/79, 143

[56] References Cited

U.S. PATENT DOCUMENTS

| | | | |
|---|---|---|---|
| 4,215,202 | 7/1980 | Park | 264/DIG. 5 |
| 4,317,888 | 3/1982 | Watanabe et al. | 264/DIG. 5 |
| 4,323,528 | 4/1982 | Collins | 264/53 |
| 4,370,378 | 1/1983 | Zabrocki et al. | 428/339 |
| 4,387,169 | 6/1983 | Zabrocki et al. | 264/53 |
| 4,528,300 | 7/1985 | Park | 521/79 |
| 4,640,933 | 2/1987 | Park | 521/94 |
| 4,983,677 | 1/1991 | Johnson et al. | 525/127 |
| 5,015,693 | 5/1991 | Duchesne et al. | 525/187 |
| 5,147,896 | 9/1992 | York | 521/79 |

FOREIGN PATENT DOCUMENTS

| | | |
|---|---|---|
| 8372618331 | 12/1981 | Japan . |
| 8632289449 | 4/1985 | Japan . |
| 9103366305 | 5/1989 | Japan . |
| 9208370211 | 5/1990 | Japan . |

OTHER PUBLICATIONS

Patent application No. 08056230 by Malone.

*Primary Examiner*—Allan R. Kuhns
*Attorney, Agent, or Firm*—J. Robert Dean, Jr.

[57] ABSTRACT

Disclosed is an extruded, unitary, closed-cell olefin polymer foam structure in plank form. The foam structure has a cross-section of 2 or more inches in one dimension and 18 or more inches in the other dimension. The olefin polymer material has a melt index of about 3.5 grams/10 minutes or less. The foam structure contains a blowing agent of about 75 mole percent or more 1,1-difluoroethane based upon the total moles of blowing agent. Further disclosed is a process for making the foam structure at a shear rate of about 400/second or more. It was found surprising that 1,1-difluoroethane which has relatively low solubility in olefin polymers, could be used to make olefin polymer foam structures of large cross-section.

14 Claims, No Drawings

PROCESS FOR MAKING LARGE CROSS-SECTION OLEFINIC POLYMER FOAM STRUCTURE BLOWN WITH 1, 1-DIFLUOROETHANE

BACKGROUND OF THE INVENTION

This invention relates to a low density, large cross-section olefinic polymer foam structure blown with a blowing agent having a large proportion of 1,1-difluoroethane.

1,1-difluoroethane (HFC-152a) has become a preferred blowing agent for making olefin polymer foam structures because of its very low ozone depletion potential. HFC-152a has presented unique processing and extrusion problems because of its relatively low solubility in melts of olefin polymers.

Due to solubility problems, it has heretofore not been possible to make an olefin polymer foam structure in large cross-section and relatively low density with large proportions of HFC-152a. It would be desirable to have a process for making olefin polymer foam structures of large cross-section and low density using a large proportion of HFC-152a.

SUMMARY OF THE INVENTION

According to the present invention, there is an extruded, unitary, closed-cell olefin polymer foam structure in plank form. The foam structure has a cross-section in one dimension of 2 or more inches and 18 or more inches in the other dimension. The olefin polymer material comprises greater than 50 percent by weight of olefin monomeric units. The olefin polymer material has a melt index of about 3.5 grams/10 minutes or less. The foam structure has a blowing agent comprising about 75 mole percent or more 1,1-difluoroethane (HFC-152a) based upon the total moles of the blowing agent. It was found surprising that HFC-152a, which has relatively low solubility in olefin polymers, could be used to make olefin polymer foam structures of large cross-section and low density.

Further according to the present invention, there is a process for making an extruded, closed-cell olefin polymer foam structure in plank form. The foam structure has a cross-section in one dimension of 2 or more inches and 18 or more inches in the other dimension. The process comprises the steps: a) heating an olefin polymer material to form a melt polymer material; b) incorporating into the melt polymer material at an elevated pressure a blowing agent to form a foamable gel; c) cooling the foamable gel to an optimum foaming temperature; and d) extruding the foamable gel through a die to form the foam structure. Preferably, it is extruded at a shear rate of about 900/second (second$^{-1}$) or more. The olefin polymer material and the blowing agent are as described above.

DETAILED DESCRIPTION

A surprising aspect of the present invention was that it was possible to make an olefin polymer foam structure of large cross-section and low density. It was not expected that HFC-152a, with its relatively low solubility and melts of olefin polymers, had adequate solubility to provide the measure of blowing or expansion necessary to make a foam structure of large cross-section and low density.

It was found that desirable foam structures could be made by proper selection of an olefin polymer resin with desirable melt viscosity characteristics (melt index) in combination with proper selection of shear rate at the extrusion die.

An important aspect of the present invention is to use an olefin resin or olefin resin blend of relatively high melt viscosity. The larger the cross-section, the higher the desirable range or permissible minimum of melt viscosity. Resin melt viscosity is most conveniently expressed in terms of melt index. As melt viscosity increases, melt index decreases. For the purposes of this invention, melt index is measured according to ASTM D-1238 at 190° C./2.16 kg.

Another important aspect of the present invention is having a shear rate at the extrusion die sufficiently high to form the desired large cross-section. The larger the desired foam cross-section, the lower the minimum permissible shear rate. Shear rate is a function of volumetric flow rate through the die and the geometry of the die orifice. For the purposes of this invention, shear rate=$(6 \times \text{rate})/(\text{width} \times \text{gap}^2)$: where "rate" is the volumetric flow rate, "width" refers to the width of the opening of the die orifice, and "gap" refers to the height of the opening of the die orifice.

A foam structure having a cross-section of 2 or more inches in one dimension and 18 or more inches in the other dimension can be made with an olefin polymer of a melt index of about 3.5 grams/10 minutes or less at a shear rate of about 900/second or more. A foam structure having a cross-section of 2 or more inches in one dimension and 24 or more inches in the other dimension can be made with an olefin polymer of a melt index of about 2.5 grams/10 minutes or less at a shear rate of about 600/second or more. A foam structure having a cross-section of 2 or more inches in one dimension and 32 or more inches in the other dimension can be made with an olefin polymer of a melt index of about 0.8 grams/10 minutes or less at a shear rate of about 500/second or more. A foam structure having a cross-section of 2 or more inches in one dimension and 48 or more inches in the other dimension can be made with an olefin polymer of a melt index of about 0.6 grams/10 minutes or less at a shear rate of about 400/second or more. The shear rates above are preferred shear rates for a given cross-section.

The present foam structure comprises an olefinic polymer material. Suitable olefinic polymer materials include olefinic homopolymers and copolymers of olefinic compounds and copolymerizable olefinically unsaturated comonomers. The olefinic polymer material may further include minor proportions of non-olefinic polymers. The olefinic polymer material may be comprised solely of one or more olefinic homopolymers, one or more olefinic copolymers, a blend of one or more of each of olefinic homopolymers and copolymers, or blends of any of the foregoing with a non-olefinic polymer. Regardless of composition, the olefinic polymer material comprises greater than 50 and preferably greater than 70 weight percent of olefinic monomeric units. Most preferably, the olefinic polymer material is comprised completely or entirely of olefinic monomeric units. A most preferred olefinic polymer is a polyethylene homopolymer. Polyethylenes may be of the high, medium, low, linear low, or ultra-low density type. Low density polyethylene is most preferred. The polyethylenes may be linear, branched, or lightly cross-linked. Polypropylene is another useful olefin polymer.

Suitable olefinic copolymers may be comprised of olefinic monomeric units and minor amounts, preferably 20 percent or less by weight, of a monoethylenically unsaturated compounds copolymerizable therewith. Suitable comonomers include $C_{1-4}$ alkyl acids and esters, ionomeric derivatives, $C_{2-6}$ dienes, and $C_{3-9}$ olefins. Examples of suitable comonomers include acrylic acid, itaconic acid, maleic acid, methacrylic acid, ethacrylic acid, methyl acrylate, methyl methacrylate, ethyl acrylate, vinyl acetate, carbon monoxide, maleic anhydride, acrylonitrile, propylene, isobutylene, and butadiene.

The present olefinic polymer foam is generally prepared by heating an olefinic polymer material to form a plasticized or melt polymer material, incorporating therein a blowing agent to form a foamable gel, and extruding the gel through a die to form the foam product. Prior to mixing with the blowing agent, the polymer material is heated to a temperature at or above its melting point. The blowing agent may be incorporated or mixed into the melt polymer material by any means known in the art such as with an extruder, mixer, blender, or the like. The blowing agent is mixed with the melt polymer material at an elevated pressure sufficient to prevent substantial expansion of the melt polymer material and to generally disperse the blowing agent homogeneously therein. Optionally, a nucleator may be blended in the polymer melt or dry blended with the polymer material prior to plasticizing or melting. The foamable gel is typically cooled to a lower temperature to optimize physical characteristics of the foam structure. The gel may be cooled in the extruder or other mixing device or in separate coolers. The gel is then extruded or conveyed through a die of desired shape to a zone of reduced or lower pressure to form the foam structure. The zone of lower pressure is at a pressure lower than that in which the foamable gel is maintained prior to extrusion through the die. The lower pressure may be superatmospheric or subatmospheric (vacuum), but is preferably at an atmospheric level.

Useful secondary organic blowing agents to use in combination with HFC-152a include aliphatic hydrocarbons having 1-9 carbon atoms, aliphatic alcohols having 1-3 carbon atoms, fully and partially halogenated aliphatic hydrocarbons having 1-4 carbon atoms, and carbon dioxide. Aliphatic hydrocarbons include methane, ethane, propane, n-butane, isobutane, n-pentane, isopentane, neopentane, and the like. A preferred blowing agent for use with HFC-152a is isobutane. Aliphatic alcohols include methanol, ethanol, n-propanol, and isopropanol. Fully and partially halogenated aliphatic hydrocarbons include fluorocarbons, chlorocarbons, and chlorofluorocarbons. Examples of fluorocarbons include methyl fluoride, perfluoromethane, ethyl fluoride, 1,1,1-trifluoroethane (HFC-143a), 1,1,1,2-tetrafluoro-ethane (HFC-134a), pentafluoroethane, difluoromethane, perfluoroethane, 2,2-difluoropropane, 1,1,1-trifluoropropane, perfluoropropane, dichloropropane, difluoropropane, perfluorobutane, perfluorocyclobutane. Partially halogenated chlorocarbons and chlorofluorocarbons for use in this invention include methyl chloride, methylene chloride, ethyl chloride, 1,1,1-trichloroethane, 1,1-dichloro-1-fluoroethane (HCFC-141b), 1-chloro-1,1-difluoroethane (HCFC-142b), chlorodifluoromethane (HCFC-22), 1,1-dichloro-2,2,2-trifluoroethane (HCFC-123) and 1-chloro-1,2,2,2-tetrafluoroethane (HCFC-124). Fully halogenated chlorofluorocarbons include trichloromonofluoromethane (CFC-11), dichlorodifluoromethane (CFC-12), trichlorotrifluoroethane (CFC-113), 1,1,1-trifluoroethane, pentafluoroethane, dichlorotetrafluoroethane (CFC-114), chloroheptafluoropropane, and dichlorohexafluoropropane.

The secondary blowing agent comprises about 25 mole percent or less of the total weight of the blowing agent. Preferred secondary blowing agents include isobutane, n-butane, carbon dioxide, or mixtures of two or more of the foregoing. A mixture of isobutane and carbon dioxide is especially preferred.

The amount of blowing agent incorporated into the polymer melt material to make a foam-forming polymer gel is from about 0.2 to about 5.0, preferably from about 0.5 to about 3.0, and most preferably from about 1.0 to 2.50 moles per kilogram of polymer.

The foam component of the present foam structure has a density of about 48 or less kilograms per cubic meter and most preferably from about 24 to about 44 kilograms per cubic meter according to ASTM D-3575. The foam has an average cell size of from about 0.1 to about 5.0 and preferably from about 1 to about 3 millimeters according to ASTM D3578.

The foam component of the present foam structure may be closed cell or open cell. Preferably, the present foam is greater than 80 percent closed-cell according to ASTM D2856-A.

It is desirable to add a stability control agent to the present foam to enhance dimensional stability. Suitable agents include any of those known in the art. Preferred agents include amides and esters of $C_{10-24}$ fatty acids. Most preferred agents include stearyl stearamide and glycerol monostearate.

The present foam structure may exhibit excellent dimensional stability. Preferred foams retain 80 or more percent of initial volume within a month with initial volume being measured within 30 seconds after extrusion.

Various additives may be incorporated in the present foam structure such as foam stability modifiers (permeability modifiers), inorganic fillers, pigments, antioxidants, acid scavengers, nucleating agents, ultraviolet absorbers, flame retardants, processing aids, extrusion aids, and the like.

In addition, a nucleating agent may be added in order to control the size of foam cells. Preferred nucleating agents include inorganic substances such as calcium carbonate, talc, clay, titanium oxide, silica, barium sulfate, diatomaceous earth, mixtures of citric acid and sodium bicarbonate, and the like. The amount of nucleating agent employed may range from about 0.01 to about 5 parts by weight per hundred parts by weight of a polymer resin.

The following are examples of the present invention, and are not to be construed as limiting. Unless otherwise indicated, all percentages, parts, or proportions are by weight.

EXAMPLES

Olefin polymer foam structures in plank form of the present invention are made according to the process of the present invention. The olefin resins employed were polyethylene homopolymers.

Various polyethylene resins of various melt indexes were melted and mixed with a blowing agent to form a foamable gel, which was extruded through dies of various sizes to form olefin polymer foam structures. The blowing agent comprised HFC-152a. Additives were 1.3 pph stearyl stearamide as a stabilty control agent and Hydrocerol CF-20 (Boerhinger Ingelheim) as a nucleating agent, 0.03 pph of Irganox 1010 (Ciba-Geigy) as an anti-oxidant. The foamable gel of the polymer melt and the blowing agent was extruded through the dies at various shear rates. Shear rate varied by adjusting the size of the dies and extrusion throughput rates. The size of the dies was varied to form foams of various cross-sections. The size (area) of the die was varied by adjusting the die gap.

The surface (skin) quality of the foam structure was examined for quality. Good foam structures exhibited relatively smooth, matte-like surfaces. Fair foam structures exhibited matte-like surfaces with some bumps and surface irregularities. Poor foam structures exhibited rough surfaces, some grooving or crevices, and larger irregularities. Acceptable foam structures had fair or good surface quality.

TABLE A

Surface (Skin) Quality of Foam Structures

| Run No. | Cross-Section (inches) [cm] | Shear Rate (l/sec) | Resin Blend (percent) | Melt Index of Blend | Actual Surface Quality |
|---|---|---|---|---|---|
| 1 | (2 × 24) [5.1 × 61] | 742 | Resin B | 1.8 | Fair-Good |
| 2 | (2 × 24) [5.1 × 61] | 742 | Resin B | 1.8 | Fair |
| 3 | (2 × 24) [5.1 × 61] | 742 | 25% Resin C 75% Resin A | 0.5 | Fair-Good |
| 4 | (2 × 24) [5.1 × 61] | 689 | 25% Resin C 75% Resin A | 0.5 | Good |
| 5 | (2 × 24) [5.1 × 61] | 618 | 80% Resin B 20% Resin A | 1.2 | Fair |
| 6 | (2 × 24) [5.1 × 61] | 618 | 25% Resin C 75% Resin A | 0.5 | Fair |
| 7 | (2 × 24) [5.1 × 61] | 618 | 35% Resin B 65% Resin A | 0.5 | Fair-Good |
| 8 | (2 × 32.5) [5.1 × 83] | 529 | 90% Resin B 10% Resin A | 1.5 | Poor |
| 9 | (2 × 32.5) [5.1 × 83] | 529 | 50% Resin B 50% Resin A | 0.6 | Fair-Good |
| 10* | (2 × 48) [5.1 × 120] | 487 | Resin B | 1.8 | Poor |
| 11* | (2 × 44) [5.1 × 110] | 458 | Resin B | 1.8 | Poor |
| 12* | (2 × 48) [5.1 × 120] | 439 | 70% Resin B 30% Resin A | 1.0 | Poor |

*Not an example of the present invention
Melt Index in grams/10 minutes according to ASTM D-1238 (190° C./2.16 kg)
Resin blends are percentages by weight based upon total weight of the polymer
Melt index is calculated by the following formula: Log (melt index of blend) = Weight Fraction$_1$ × Log(Melt Index$_1$) + Weight Fraction$_2$ × Log(Melt Index$_2$)
Resins A, B, and C are polyethylene homopolymers having melt indexes of 0.22, 1.8, and 6.0 respectively as determined by ASTM D-1238 (190° C./2.16 kg).
Resins A, B, and C have densities of 0.921, 0.923, 0.924 grams/cubic centimeters, respectively.

While embodiments of the foam structure and the process of the present invention have been shown with regard to specific details, it will be appreciated that depending upon the manufacturing process and the manufacturer's desires, the present invention may be modified by various changes while still being fairly within the scope of the novel teachings and principles herein set forth.

What is claimed is:

1. The process for making an extruded, closed-cell olefin polymer foam structure in plank form having a cross-section in one dimension of 2 or more inches and 18 or more inches in the other dimension and a density of 48 kilograms per cubic meter or less, comprising:
   a) heating an olefin polymer material comprising greater than 50 percent by weight olefin monomeric units to form a melt polymer material, the olefin polymer material having a melt index of about 3.5 grams/10 minutes or less;
   b) incorporating into the melt polymer material at an elevated pressure a blowing agent to form a foamable gel wherein the blowing agent consists essentially of 1,1-difluoroethane;
   c) cooling the foamable gel to an optimum foaming temperature; and
   d) extruding the foamable gel through a die at a shear rate of about 400/second or more into a region of reduced pressure to form the foam structure.

2. The process of claim 1, wherein a stability control agent is incorporated into the melt polymer material.

3. The process of claim 1, wherein the foam structure has a cross-section in one dimension of 2 or more inches and 24 or more inches in the other dimension, and the olefin polymer material has a melt index of about 2.5 grams/10 minutes or less.

4. The process of claim 1, wherein the foam structure has a cross-section in one dimension of 2 or more inches and 32 or more inches in the other dimension, and the olefin polymer material has a melt index of about 0.8 grams/10 minutes or less.

5. The process of claim 1, wherein the foam structure has a cross-section in one dimension of 2 or more inches and 48 or more inches in the other dimension, and the olefin polymer material has a melt index of about 0.6 grams/10 minutes or less.

6. The process of claim 4, wherein a stability control agent is incorporated into the melt polymer material.

7. The process of claim 5, wherein a stability control agent is incorporated into the melt polymer material.

8. The process of claim 1, wherein the blowing agent consists of 1,1-difluoroethane.

9. The process of claim 1, wherein the foam structure has a density of about 24 to about 44 kilograms per cubic meter.

10. The process of claim 1, wherein the olefin polymer material comprises greater than 70 percent by weight of olefin monomeric units.

11. The process of claim 1, wherein the olefin polymer material comprises low density polyethylene.

12. The process of claim 1, wherein the olefin polymer material comprises polypropylene.

13. The process of claim 1, wherein a stability control agent is incorporated into the melt polymer material.

14. The process of claim 13, wherein a nucleating agent is incorporated into the melt polymer material.

* * * * *